US011919022B2

(12) United States Patent
Seiz et al.

(10) Patent No.: US 11,919,022 B2
(45) Date of Patent: Mar. 5, 2024

(54) ATOMIZER AND ASSOCIATED OPERATING METHOD

(71) Applicant: Dürr Systems AG, Bietigheim-Bissingen (DE)

(72) Inventors: Bernhard Seiz, Lauffen (DE); Sascha Hermann, Korb (DE); Eduard Frühsorger, Zaberfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/773,061

(22) PCT Filed: Nov. 10, 2020

(86) PCT No.: PCT/EP2020/081565
§ 371 (c)(1),
(2) Date: Apr. 29, 2022

(87) PCT Pub. No.: WO2021/094278
PCT Pub. Date: May 20, 2021

(65) Prior Publication Data

US 2023/0148199 A1 May 11, 2023

(30) Foreign Application Priority Data

Nov. 13, 2019 (DE) ..................... 10 2019 130 612.4

(51) Int. Cl.
*B05B 14/00* (2018.01)
*B01F 25/4314* (2022.01)
(Continued)

(52) U.S. Cl.
CPC ........ *B05B 14/00* (2018.02); *B01F 25/43141* (2022.01); *B05B 7/0408* (2013.01); *B05B 15/55* (2018.02); *B01F 2101/30* (2022.01)

(58) Field of Classification Search
CPC ....... B05B 14/00; B05B 15/55; B05B 7/0408; B01F 25/43141; B01F 2101/30
(Continued)

(56) References Cited

U.S. PATENT DOCUMENTS

| | | | |
|---|---|---|---|
| 9,782,786 | B2 | 10/2017 | Melcher et al. |
| 10,302,215 | B2 | 5/2019 | Melcher et al. |

(Continued)

FOREIGN PATENT DOCUMENTS

| | | | |
|---|---|---|---|
| CN | 201728173 | U | 2/2011 |
| DE | 10322998 | A1 | 9/2004 |

(Continued)

OTHER PUBLICATIONS

International Search Report and Written Opinion for PCT/EP2020/081565 dated Feb. 12, 2021 (11 pages; with English translation).
(Continued)

*Primary Examiner* — Christopher S Kim
(74) *Attorney, Agent, or Firm* — Bejin Bieneman PLC

(57) ABSTRACT

The disclosure relates to an atomizer for the application of a multi-component paint, with a master paint connection, a hardener connection, a mixer, a hardener line leading in the atomizer from the hardener connection to the mixer, a master paint line, which in the atomizer leads from the master paint connection to the mixer, and with a main valve for controlling the paint delivery, the main valve being arranged downstream of the mixer and controlling the flow of the multicomponent paint to an application element, in particular to a rotatable bell cup. The atomizer according to the disclosure is characterized by a first return connection for returning the multicomponent paint from the atomizer to a return system. For this purpose, the atomizer has a first
(Continued)

return line which branches off in the atomizer between the mixer and the main valve and opens into the first return connection.

10 Claims, 4 Drawing Sheets

(51) Int. Cl.
*B01F 101/30* (2022.01)
*B05B 7/04* (2006.01)
*B05B 15/55* (2018.01)

(58) Field of Classification Search
USPC .................................. 239/124, 106, 112, 413
See application file for complete search history.

(56) References Cited

U.S. PATENT DOCUMENTS

| | | | |
|---|---|---|---|
| 10,807,110 | B2 | 10/2020 | Herre et al. |
| 2004/0249105 | A1 | 12/2004 | Nolte et al. |
| 2012/0114849 | A1 | 5/2012 | Melcher et al. |
| 2013/0108796 | A1 | 5/2013 | Michelfelder et al. |
| 2015/0090347 | A1 | 4/2015 | Melcher et al. |
| 2018/0029062 | A1 | 2/2018 | Melcher et al. |
| 2018/0185860 | A1 | 7/2018 | Herre et al. |

FOREIGN PATENT DOCUMENTS

| | | | |
|---|---|---|---|
| DE | 10 2009 020 064 | A1 | 11/2010 |
| DE | 10 2015 010 158 | A1 | 1/2017 |
| EP | 3444025 | A1 | 2/2019 |
| JP | S62247853 | A | 10/1987 |
| WO | 2004076515 | A1 | 9/2004 |
| WO | 2009019036 | A1 | 2/2009 |

OTHER PUBLICATIONS

German Patent and Trademark Office Action for Application No. DE 10 2019 130 612.4 dated Jul. 15, 2020 (12 pages; with English machine translation).
China State Intellectual Property Office First Notice of Examination Action for related application No. CN202080079099.2 dated Nov. 9, 2023 (22 pages; with English machine translation).

ATOMIZER AND ASSOCIATED OPERATING METHOD

CROSS-REFERENCE TO RELATED APPLICATIONS

This application is a national stage of, and claims priority to, Patent Cooperation Treaty Application No. PCT/EP2020/081565, filed on May 13, 2022, which application claims priority to German Application No. DE 10 2019 130 612.4, filed on Nov. 13, 2019, which applications are hereby incorporated herein by reference in their entireties.

The disclosure relates to an atomizer (e.g. rotary atomizer) for applying a multi-component paint and an associated operating method.

BACKGROUND

In modern painting plants for painting motor vehicle body components, rotary atomizers are usually used as application devices, which in one design can also apply a multi-component paint, which is mixed together in the rotary atomizer from a master paint and a hardener. Such a painting system is known, for example, from DE 10 2015 010 158 A1.

A problem here is the collection of paint residues that occur, for example, during a color change.

One possibility for this is the use of so-called wet washout systems. In this case, the multicomponent reactive coating material introduced into the wet washout is filtered out of water with suitable chemicals (e.g. flocculation, floatulation), whereby the filter residue must then be disposed of as hazardous waste, which is extremely costly.

Another possibility is the use of so-called dry rinsing. In this case, the multi-component reactive paint material must not be discharged directly into the paint booth. Separate installations are currently required for this, such as solvent-flushed collection hoppers or collection containers with filter mats, which require a great deal of maintenance and cleaning.

With all currently available solutions, volatile organic compounds (VOCs), among other things, are introduced into the paint booth. These organic components may then have to be purified from the exhaust air in a further process step.

In the case of a color change with the associated flushing and pressurizing processes, the rotary atomizer is arranged, for example, above a rinsed collecting hopper or a collecting container, whereupon the paint residue of the multicomponent paint can then be rinsed out of the rotary atomizer into the collecting hopper or collecting container. However, this requires the rotary atomizer to move to the collecting hopper, which takes additional time and results in a high loss of cycle time, i.e. the time required for a paint change extends the required cycle time of the paint system.

Another disadvantage of this flushing of the multicomponent paint into a collecting hopper or a collecting container is that parallel cleaning of the outer surfaces of the atomizer is not possible during a paint change. As a result, these process steps have to be carried out one after the other, which in turn requires additional time. For example, the rotary atomizer can first be moved into a collecting hopper or collecting container to rinse out paint residues from the multicomponent paint. The rotary atomizer can then be moved into a cleaning device to clean the outer surfaces of the rotary atomizer.

Furthermore, DE 10 2009 020 064 A1 discloses a painting system for painting single-component paint, whereby an intrinsically medium-actuated return valve enables the recirculation of paint foam during a color change.

DETAILED DESCRIPTION

Figure 1:
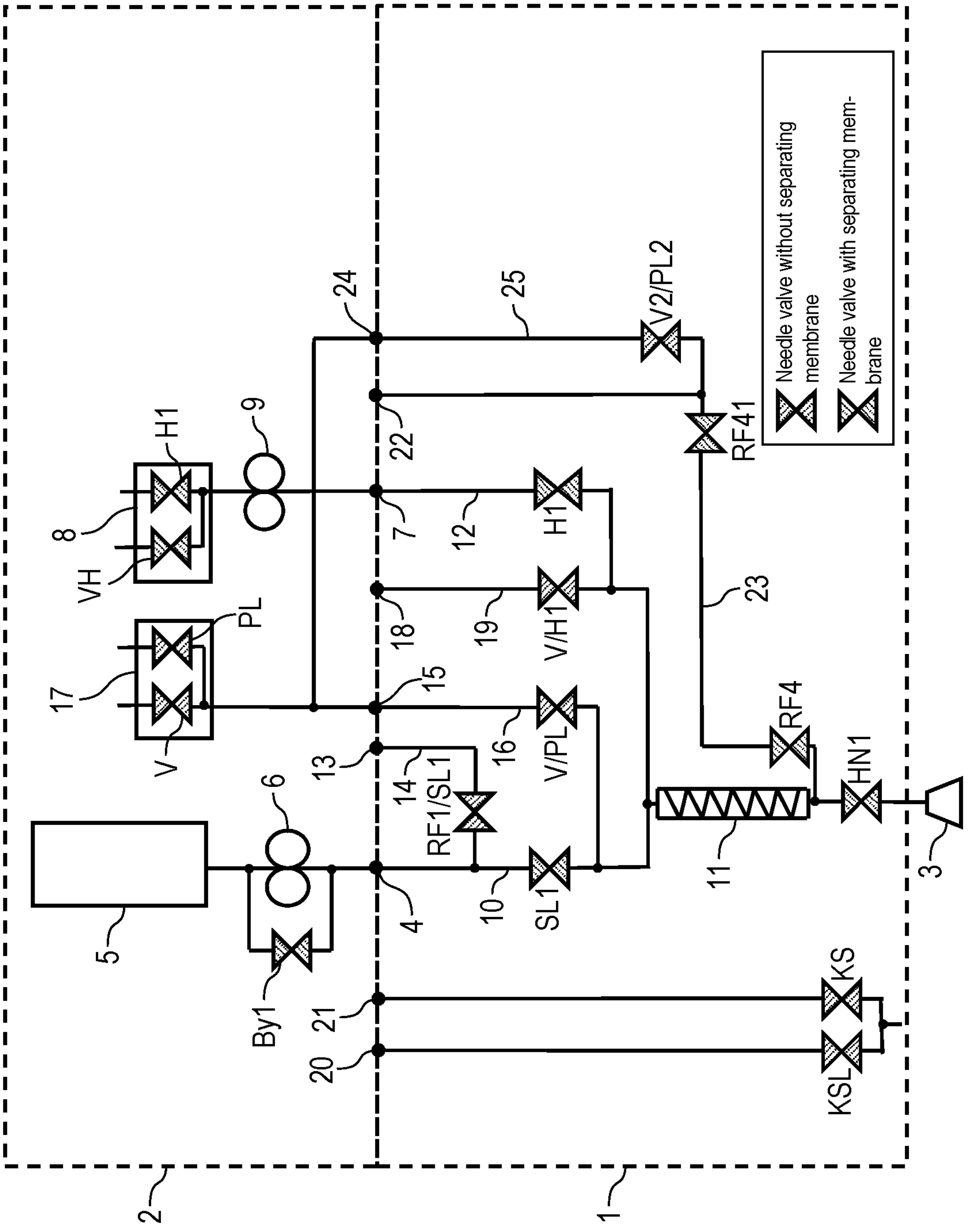
FIG. 1 a schematic representation of a rotary atomizer according to the disclosure on an arm of a painting robot, FIG. 2A a cross-sectional view through a main needle valve according to the disclosure with an integrated return system, FIG. 2B the main needle valve of FIG. 2A with the opened return system, FIGS. 3A and 3B a flow chart to illustrate the operating procedure according to the disclosure.

The disclosure is based on the task of creating a correspondingly improved atomizer and a corresponding operating method.

The disclosure comprises the general technical teaching of flushing paint residues of the multicomponent paint out of the rotary atomizer not in the direction of the application element (e.g., bell cup), but into a separate return. This offers the advantage that two process steps can take place at the same time during a color change, namely on the one hand the flushing of residues of the multicomponent paint from the atomizer and on the other hand the external cleaning of the atomizer. This makes it possible to shorten the cycle time of the painting system, i.e. the operating speed is increased.

The atomizer according to the disclosure has many similarities with the known atomizers as they are known from the prior art.

Thus, the atomizer according to the disclosure also has a master paint connection for supplying a master paint and a hardener connection for supplying a hardener.

In addition, the atomizer according to the disclosure also has a mixer for mixing the master paint with the hardener to form the multicomponent paint. Such a mixer is usually designed as a static mixer (e.g. grid mixer, spiral mixer).

In the atomizer, a hardener line runs from the hardener connection to the mixer. Furthermore, a master paint line runs in the atomizer from the master paint connection to the mixer.

Furthermore, the atomizer contains a main valve for controlling the paint delivery, the main valve being arranged downstream of the mixer and controlling the flow of the multicomponent paint to an application element (e.g. bell cup).

The atomizer according to the disclosure thus takes up hardener and basecoat on the input side, mixes these paint components in the mixer to form a multicomponent paint and then delivers the multicomponent paint via the application element (e.g. bell cup) to the component to be coated.

The atomizer according to the disclosure is now characterized by a first return connection for returning the multicomponent paint from the atomizer to a return system, which occurs, for example, during a color change, as will be described in detail. A first return line runs in the atomizer, which branches off in the atomizer between the mixer and the main valve and opens into the first return connection. During a color change, the main valve is usually closed so that no more multicomponent paint is dispensed via the application element. The residues of the multicomponent paint still present in the atomizer can then be fed via the first return line into the first return connection, which is usually connected to a return system.

It should be mentioned here that the atomizer can also have several main needle valves and several 2K return systems.

In general, it should be mentioned that the atomizer according to the disclosure is preferably a rotary atomizer which has a bell cup as an application element, as is in itself sufficiently known from the prior art. In principle, however, the disclosure can also be implemented with other atomizer types, such as air atomizers.

In a preferred embodiment of the disclosure, a downstream-located controllable first return valve and an upstream-located controllable second return valve, which can preferably be controlled independently of each other, are located in series in the first return line in the atomizer. This offers the possibility that flushing medium is trapped between the two return valves in the first return line to prevent a reaction between different mixed paint systems or to reduce it to a tolerable level.

In addition, the atomizer according to the disclosure preferably has a first flushing connection to supply thinner (flushing agent) and/or pulse air. In practice, pulsed air blasts and thinner are supplied alternately to achieve the best possible flushing effect. A first flushing line runs in the atomizer, starting from the first flushing connection and opening into the first return line downstream of the downstream first return valve. The return line provided in accordance with the disclosure can thus be flushed via this first flushing connection and the first flushing line originating therefrom. For this purpose, a first flushing valve is preferably arranged in the first flushing line in order to control the inflow of thinner or pulsed air from the first flush connection into the first return line.

Furthermore, the atomizer according to the disclosure preferably comprises at least one controllable hardener valve arranged in the hardener line to control the inflow of the hardener. Similarly, there is preferably at least one controllable master paint valve arranged in the master paint line and controlling the inflow of the master paint.

In addition, the atomizer according to the disclosure preferably has a second return connection for returning the master paint separately from the hardener before mixing with the hardener. A second return line runs in the atomizer, which branches off from the master paint line upstream of the master paint valve and opens into the second return connection. A controllable third return valve is preferably arranged in this second return line, which controls the recirculation of the master paint through the second return connection. Thus, during a recirculation of master paint, the master paint valve is usually closed while the third return valve is open, so that the master paint supplied on the inlet side is recirculated into the second return line.

Furthermore, the atomizer according to the disclosure preferably has a second flushing line which starts from a second flushing connection or from the first flushing connection and opens into the master paint line downstream of the master paint valve. Preferably, a second flushing valve is provided, which is arranged in the second flushing line and controls the inflow of flushing agent into the master paint line. In addition, a third flushing line is preferably provided, which starts from a third flushing connection or from the first flushing connection or the second flushing connection and opens into the hardener line downstream of the hardener valve. A third flushing valve is preferably arranged in this third flushing line, which controls the inflow of flushing agent into the hardener line.

Thus, in the atomizer according to the disclosure, the hardener line and the master paint line can preferably be flushed independently of one another, with the flushing agent supply being controlled in each case by a flushing valve.

In addition, the atomizer according to the disclosure can have a short-flushing line which leads downstream of the main valve to the application element and starts from the first flushing connection or from the second flushing connection or from a third flushing connection or from a further fourth flushing connection. In this short-flushing line there is preferably a controllable short-flushing valve which controls the flow of the flushing agent through the short-flushing line.

Furthermore, it should be mentioned that the atomizer according to the disclosure preferably includes a paint tube containing the mixer and the upstream second return valve. Here it should be mentioned that the paint tube preferably also contains the main valve, which can be designed as a main needle valve and has a displaceable valve needle. Here it is possible that the valve needle of the main needle valve is designed as a static mixer (e.g. lattice mixer, spiral mixer), i.e. the valve needle fulfills two functions here. On the one hand, the valve needle serves as a valve element for controlling the material flow. On the other hand, the valve needle also forms the static mixer.

In the preferred embodiment, the upstream second return valve is designed as a diaphragm needle valve. This means that the diaphragm needle valve has a valve seat and a displaceable valve needle which releases or blocks the valve seat depending on its position. In addition, such a diaphragm needle valve is characterized by a valve diaphragm which annularly surrounds the valve needle and serves to drive the valve needle and/or to seal it. Such diaphragm needle valves are known, for example, from WO 2009/019036 A1, so that the contents of this patent application can be fully attributed to the present description with regard to the design structure and operation of a diaphragm needle valve.

Here, the valve seat of the second return valve may be made of steel, while the valve needle of the second return valve may pass through a sealing disc made of plastic and may be made of titanium, for example. Furthermore, the mixer can open into a distributor on the outlet side, which passes on the mixed multicomponent paint and is at least partially made of metal.

It has already been explained above what is meant by a membrane needle valve in the context of the disclosure. In the preferred embodiment, the main valve, the first return valve, the second return valve, the hardener valve and/or the master paint valve are also designed as such membrane needle valves.

Furthermore, it should be mentioned that the disclosure does not only claim protection for the above generally described atomizer according to the disclosure. Rather, the disclosure also claims protection for a corresponding operating method for such an atomizer, in which master paint and hardener are supplied and mixed in the atomizer to form the multicomponent paint, and then finally applied, for example via a rotating bell cup.

The operating method according to the disclosure is characterized by the fact that the multicomponent paint is recirculated through the first return line, which branches off between the mixer and the main valve, during a color change. In contrast to the known rotary atomizer, the residues of the multicomponent paint are therefore not discharged via the application element.

Preferably, the main valve (e.g. main needle valve) of the atomizer (e.g. rotary atomizer) is closed during recirculation of the multicomponent paint.

In the case of a color change, the following steps are then preferably carried out in this sequence to press on the atomizer with new paint:

Closing of the main valve, opening the first return valve and the second return valve, opening the master valve to fill the master line with the master paint, opening the hardener valve to fill the hardener line with the hardener, returning the old multicomponent paint and part of the remaining flushing agent and the new multicomponent paint through the first return line into the first return system, and closing the master paint valve, the hardener valve, the first return valve and the second return valve in this order. The sequence of valve closure here ensures that the paint medium/solvent mixture in the first return line is sealed airtight. In addition, a reaction with atmospheric moisture can thus be prevented.

In the operating method according to the disclosure, the following steps are preferably carried out for flushing the atomizer during a color change:

Opening of the second flushing valve and flushing of the master paint line, opening the third flushing valve and flushing the hardener line, opening the first return valve and the second return valve and flushing out the old multicomponent paint and the flushing agent through the first return line, filling the master paint line and the hardener line and the first return line with the flushing agent, and closing the first return valve and the second return valve when the first return line is filled with the flushing agent.

To flush the first return line during application of the multicomponent paint, the first flushing valve is then preferably closed and flushing agent is introduced into the first return line. Preferably, solvent and pulsed air are alternately fed in to achieve a good cleaning effect. At the end of the flushing process, solvent is then preferably supplied to partially fill the first return line with the flushing agent.

The design of the atomizer according to the disclosure allows the following steps to be carried out simultaneously or at least overlapping in time:

External cleaning of the atomizer, in particular by spraying the atomizer with a solvent, and color change in the atomizer, in particular with a flushing of the atomizer into the first return line and a pressurizing of the atomizer with the new master paint and the new hardener.

The disclosure offers several advantages that can be summarized as follows.

During the color change, material is no longer discharged through the paint nozzle.

As a result, the atomizer external cleaning can be carried out in parallel with the paint change. This means that the paint change can be carried out in a normal cycle gap of 15 seconds without any loss of cycle time. This increases the capacity of the paint line.

Cost savings due to the elimination of the receiving hoppers or collecting containers. In this context, the time-consuming cleaning and maintenance of these installations is also eliminated.

Significant reduction in complexity due to the elimination of the following process steps or concepts:

Positioning of the receiving hoppers or collecting containers in the paint booth Motion travel (programming of teach programs)

Safety concept (software protection to switch off the high voltage)

As a result of the disclosure and the elimination of the rinsed receiving hoppers, significantly fewer VOCs are introduced into the booth and solvents are saved. This may mean omission or reduction of exhaust air purification, if necessary.

When wet scrubbing is used, the use of chemicals can be significantly reduced.

The mixture of multi-component reactive paint material and solvent collected via the new recirculation system is collected in a central location and can be returned to the manufacturer for recycling. This contributes to cost reduction as well as environmental protection.

FIG. 1 shows a schematic representation of a rotary atomizer 1 according to the disclosure, which is mounted on a robot arm 2 of a conventional painting robot with serial robot kinematics. The robot arm 2 is the distal robot arm of the painting robot, which is also referred to as "arm 2" in accordance with the usual technical terminology.

The rotary atomizer 1 is used to apply a multicomponent paint via a rotating bell cup 3, as is known from the prior art.

For the supply of a master paint, the rotary atomizer 1 has a master paint connection 4, the master paint connection 4 of the rotary atomizer 1 being supplied with the desired master paint by a color changer 5 in the robot arm 2.

A metering pump 6 is arranged between the color changer 5 and the master paint connection 4 of the rotary atomizer 1, which delivers the master paint with the desired paint flow. The metering pump 6 can be bypassed by a bypass valve By1 connected in parallel.

In addition, the rotary atomizer 1 has a hardener connection 7 for supplying hardener. The hardener is supplied by a valve unit 8 with a hardener valve H1 and a thinner valve VH via a metering pump 9.

Figure 2A:
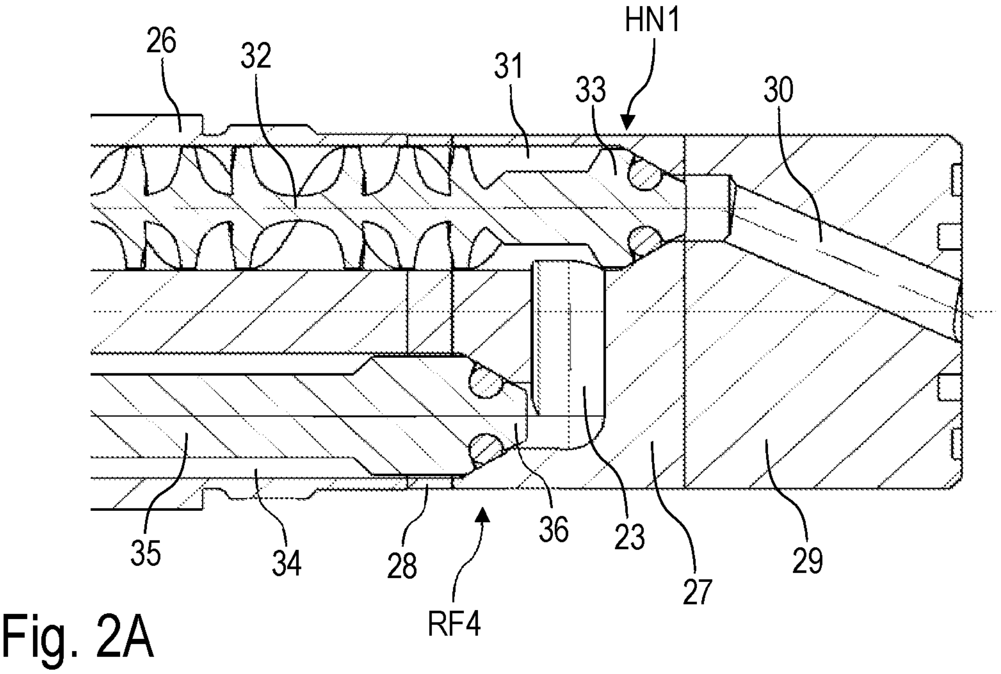
Figure 2B:
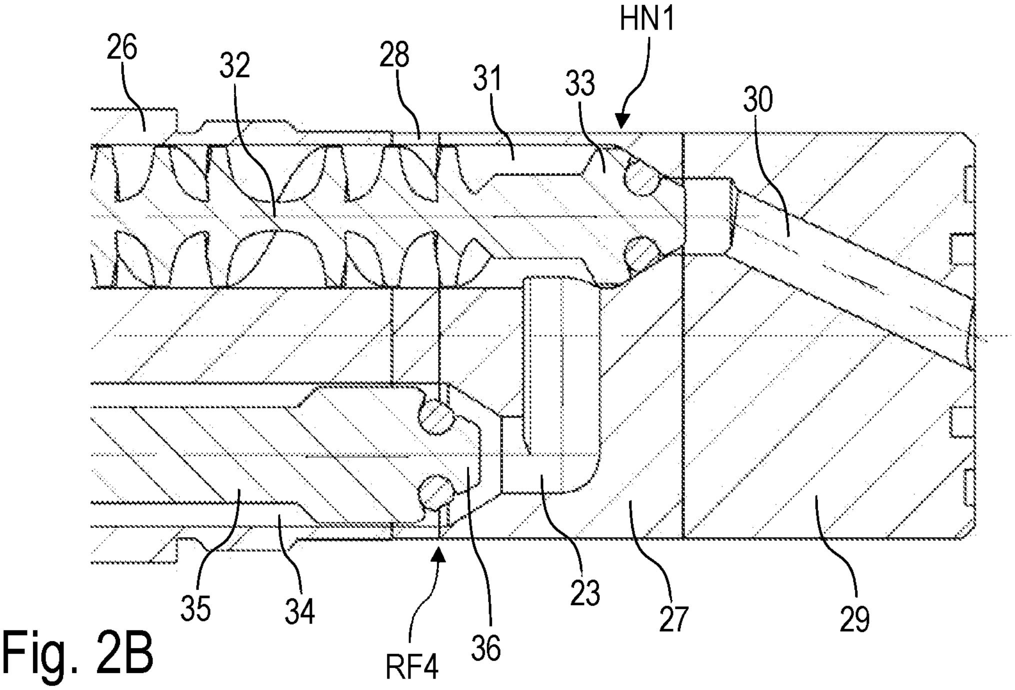

In the rotary atomizer 1, a master paint line 10 starts from the master paint connection 4, which opens via a master paint valve SL1 into a static mixer 11, which in the preferred embodiment is designed as a spiral mixer, as shown in FIGS. 2A and 2B.

Accordingly, a hardener line 12, in which a hardener valve H1 is arranged to control the inflow of hardener, emanates from the hardener connection 7. The hardener line 12 also opens into the mixer 11, so that the mixer 11 mixes the master paint with the hardener.

Downstream of the mixer 11, a main needle valve HN1 is arranged to control the flow of the multicomponent paint from the mixer 11 to the bell cup 3. The structure and operation of the main needle valve HN1 are shown in FIGS. 2A and 2B, and will be described separately.

In addition, the rotary atomizer 1 has a return connection 13 for returning master paint to a recirculation system not shown. For this purpose, a return line 14 runs in the rotary atomizer 1, which branches off from the master paint line 10 between the master paint connection 4 and the master paint valve SL1 and opens into the return connection 13. A return valve RF1/SL1 is located in this return line 14, which controls the flow into the recirculation.

Furthermore, the rotary atomizer has a flushing connection 15 for flushing the master paint line 10. A flushing line 16 starts from the flushing connection 15 and opens into the master paint line 10 downstream of the master paint valve SL1. A flushing valve V/PL is located in the flushing line 16 for flushing the master paint line 10.

A valve unit 17 with a thinner valve V and a pulsed air valve PL is located in the robot arm 2 of the painting robot, whereby the valve unit 17 can optionally supply thinner (flushing agent) or pulsed air to the flushing connection 15.

Furthermore, the rotary atomizer 1 comprises a flushing connection 18 for flushing the hardener line 12. A flushing line 19 starts from the flushing connection 18 and opens into the hardener line 12, a flushing valve V/H1 being arranged in the flushing line 19.

Furthermore, the rotary atomizer 1 has short-flushing connections 20, 21 for short-flushing of the rotary atomizer 1, as is known per se from the prior art and therefore need not be described in detail. It is only to be mentioned that the rotary atomizer 1 contains short-flushing valves KSL, KS for short-flushing.

The rotary atomizer 1 is now characterized by a return connection 22, which enables recirculation of the multicomponent paint into a recirculation system not shown. For this purpose, a return line 23 branches off in the rotary atomizer 1 between the mixer 11 and the main needle valve HN1 and opens into the return connection 22. Two return valves RF4, RF41 are located one after the other in the return line 23, whereby the return valve RF4 located upstream is also shown in FIGS. 2A, 2B and will still be described separately.

For flushing the return line 23, the rotary atomizer 1 has a further flushing connection 24, which can be supplied with thinner or pulse air by the valve unit 17. In the rotary atomizer 1, a flushing line 25 starts from the flushing connection 24, which opens into the return line 23 via a flushing valve V2/PL2 and enables flushing of the return line.

The valves in the robot arm 2 and in the rotary atomizer 1 are partly designed as conventional needle valves without a separating diaphragm, which can be recognized by the corresponding hatching, as indicated in the drawing legend. In part, however, the valves are designed as needle valves with a separating diaphragm, as known per se from WO 2009/019036 A1 GINA—see if there is a U.S. equivalent and if so add the words "which is incorporated herein by reference.

In the following, FIGS. 2A and 2B are described, which illustrate the design and operation of the main needle valve HN1, the mixer 11 and the return valve RF4. FIG. 2A shows a closed state of both the main needle valve HN1 and the return valve RF4. In the illustration according to FIG. 2B, the main needle valve HN1 is also closed, while the return valve RF4 is open.

The drawings here show an paint tube 26 accommodating the main needle valve HN1, the mixer 11 and the return valve RF4, whereby the paint tube 26 also leads to the bell cup 3, as is known per se from the prior art.

A needle seat 27 is connected to the paint tube 26, with a sealing disk 28 made of POM (polyoxymethylene) being arranged between the paint tube 26 and the needle seat 27.

Finally, a distributor 29 is arranged behind the needle seat 27, which is also made of POM and contains a paint line 30 that leads to the bell cup 3.

The paint tube 26, the sealing disk 28 and the needle seat 27 contain an axially continuous bore 31 which opens into the paint line 30.

A valve needle 32 is displaceable in the bore 31 in the direction of the double arrow, the valve needle 32 having two functions.

Firstly, the valve needle 32 is designed as a spiral mixer and thus forms the mixer 11 for mixing the master paint and the hardener.

On the other hand, the valve needle 32 serves in a conventional manner as a valve element for controlling the paint flow into the paint line 30. For this purpose, the valve needle 32 has a valve head 33 which either clears or closes a corresponding valve seat.

The return valve RF4 is arranged in a further axial bore 34 and has a valve needle 35 which is displaceable in the bore 34 in the direction of the double arrow. The valve needle 35 of the return valve RF4 also has a valve head 36 that either closes (as in FIG. 2A) or clears (as in FIG. 2B) a valve seat.

Further, FIGS. 2A and 2B show a line section of the return line 23 that is selectively unblocked or blocked by the return valve RF4.

Figure 3A:
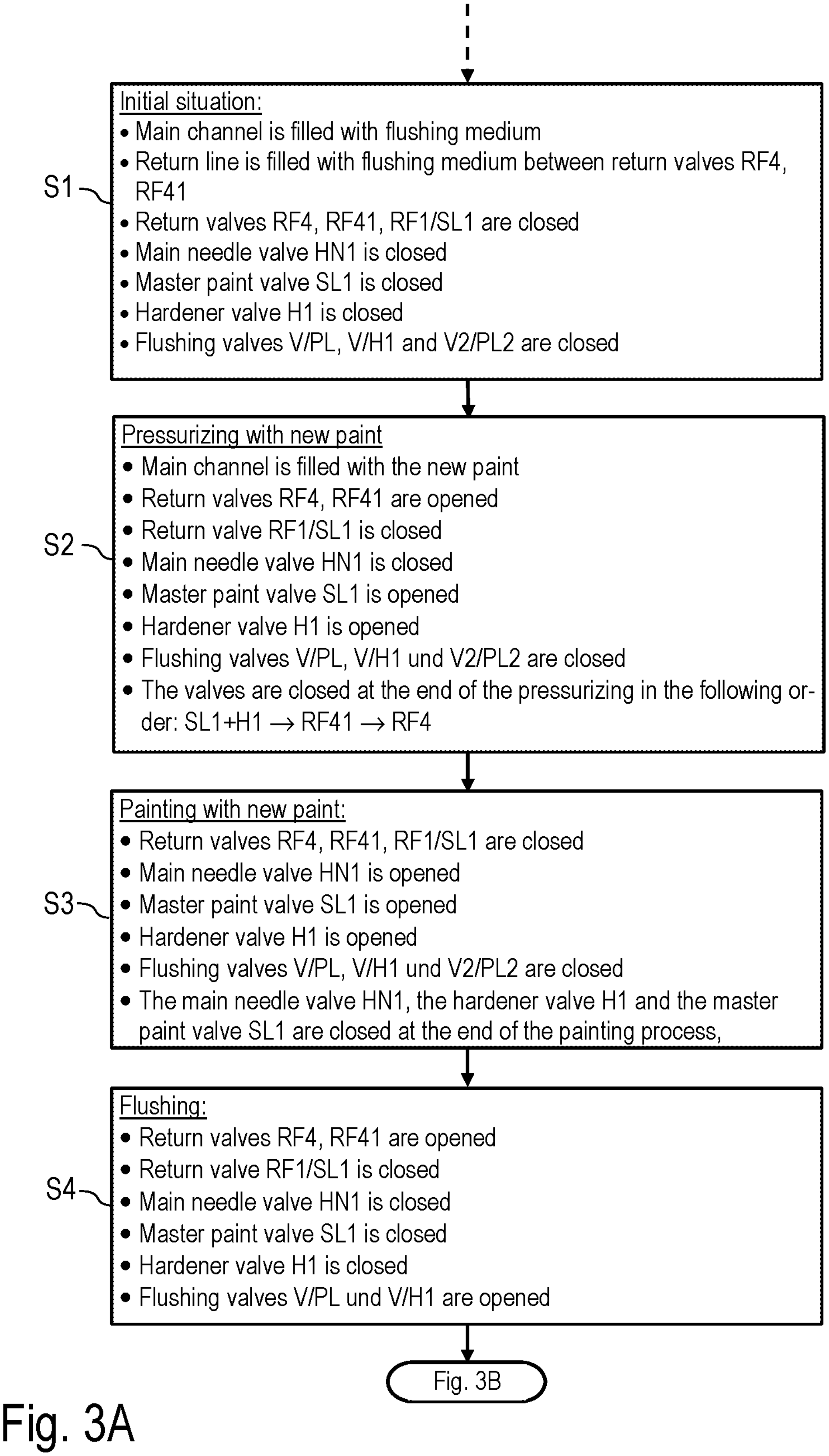
Figure 3B:
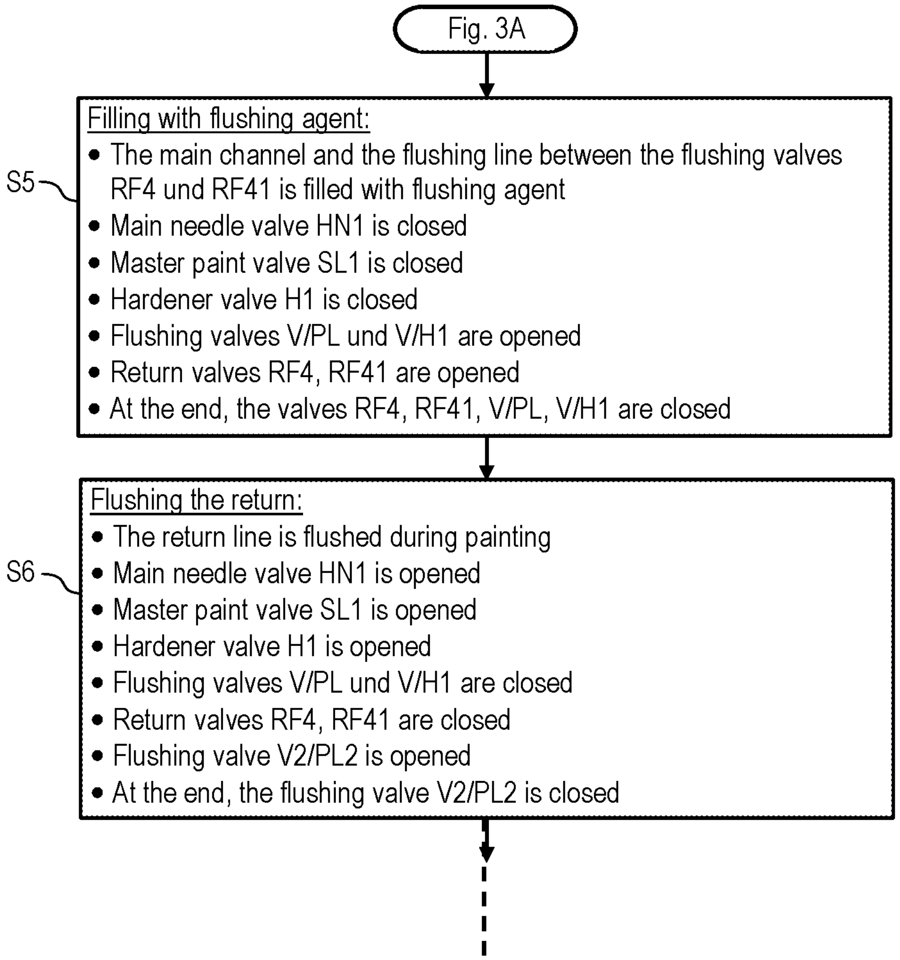

In the following, the flowchart in FIGS. 3A and 3B will now be described, which explains the operating method according to the disclosure.

In a first step S1, an initial situation is first shown.

In this initial situation, the main channel is filled with flushing medium, while the return line 23 between the return valves RF4, RF41 is filled with flushing medium. In this initial situation, the return valves RF4, RF41, RF1/SL1 are closed. The main needle valve HN1, the master paint valve SL1 and the hardener valve H1 are also closed, as are the flushing valves V/PL, V/H1 and V2/PL2.

Step S2 now shows the pressurizing of the rotary atomizer 1 with a new paint.

The main channel is filled with the new paint. During this process, the return valves RF4, RF41 are open, while the return valve RF1/SL1 and the main needle valve HN1 are closed. The master paint valve SL1 and the hardener valve H1, on the other hand, are open, while the flushing valves V/PL, V/H1 and V2/PL2 are closed.

At the end of this pressure, the master paint valve SL1 and the hardener valve H1 are then closed first. Next, the return valve RF41 is closed. The return valve RF4 is then closed last. This sequence for closing the valves during press-on ensures that the paint medium/solvent mixture is sealed airtight in the atomizer recirculation. In addition, a reaction with atmospheric moisture can thus be prevented.

In a step S3, painting is then carried out with the new paint. During this step, the return valves RF4, RF41, RF1/SL1 are closed, while the main needle valve HN1, the master paint valve SL1 and the hardener valve H1 are open. The flushing valves V/PL, V/H1 and V2/PL2 are also closed during painting. At the end of the painting process, the main needle valve HN1, the hardener valve H1 and the master paint valve SL1 are closed.

In a next step S4, flushing of the rotary atomizer 1 is then carried out after the end of the painting process. In this process, the return valves RF4, RF41 are opened, while the return valve RF1/SL1, the main needle valve HN1, the master paint valve SL1 and the hardener valve H1 are closed, while the flushing valves V/PL and V/H1 are opened.

In a next step S5, the filling with flushing agent then takes place, whereby the main channel and the flushing line 23 between the flushing valves RF4 and RF41 are filled with flushing agent. The valve position of the various valves is indicated here in step S5.

Finally, in a step S6, a flushing of the recirculation is carried out according to the disclosure, whereby the return line 23 can be flushed during the painting process described above. During this process, the main needle valve HN1, the master paint valve SL1, the hardener valve H1 are open to allow painting. The flushing valves V/PL and V/H1, on the other hand, are closed, which also applies to the return valves RF4, RF41. The flushing valve V2/PL2, on the other hand, is open, and the flushing valve V2/PL2 is closed again at the end of the flushing process.

The disclosure is not limited to the preferred embodiment described above. Rather, a large number of variants and modifications are possible which also make use of the inventive idea and therefore fall within the scope of protection. In particular, the disclosure also claims protection for the subject-matter and the features of the dependent claims independently of the claims referred to in each case and in particular also without the features of the main claim. The disclosure thus comprises various aspects of disclosure which enjoy protection independently of one another.

LIST OF REFERENCE SIGNS

1 Rotary atomizer
2 Robot arm ("Arm 2")
3 Bell cup
4 Master paint connection
5 Color changer
6 Metering pump for master paint
7 Hardener connection
8 Valve unit with hardener valve H1 and thinner valve VH for hardener
9 Metering pump for hardener
10 Master paint line
11 Mixer
12 Hardener line
13 Return connection for master paint
14 Return line for master paint
15 Flushing connection for flushing the master paint line
16 Flushing line for flushing the master paint line
17 Valve unit with pulsed air valve PL and thinner valve V for master paint
18 Flushing connection for flushing the hardener line
19 Flushing line for flushing the hardener line
20, 21 Short-flushing connections
22 Feedback connection
23 Return line
24 Flushing connection
25 Flushing line for flushing the return line
26 Paint tube
27 Needle seat
28 Sealing washer made of POM
29 Distributor made of POM
30 Paint line to bell cup
31 Bore for valve needle
32 Valve needle as helical mixer
33 Valve head of valve needle
34 Bore for return valve RF4
35 Valve needle of return valve RF4
36 Valve head of return valve RF4
By1 Bypass valve for metering pump
H1 Hardener valve
SL1 Master paint valve
RF1/SL1 Return valve for master paint
V/PL Flushing valve for flushing the master paint line
V/H1 Flushing valve for flushing the hardener line
HN1 Main needle valve
RF4, RF41 Return valves in the return line
V2/PL2 Flushing valve for flushing the return line
KS, KSL Short-flushing valves

The invention claimed is:

1. An atomizer adapted for applying a multicomponent paint, comprising:

a) at least one master paint connection for supplying a master paint, b) at least one hardener connection for supplying a hardener, c) at least one mixer for mixing the master paint with the hardener to form the multicomponent paint, d) at least one hardener line leading in the atomizer from the hardener connection to the mixer, e) at least one master paint line leading in the atomizer from the master paint connection to the mixer, f) at least one main valve for controlling a delivery of the multicomponent paint, the main valve being arranged downstream of the mixer and controlling a flow of the multicomponent paint to an application element, g) a first return connection for returning the multicomponent paint from the atomizer to a return line, and h) a first return line which branches off in the atomizer between the mixer and the main valve and opens into the first return connection, wherein a controllable first return valve being located downstream and a controllable second return valve being located upstream are arranged in series in the first return line.

2. An atomizer according to claim 1, further comprising:

a) a first flushing connection for supplying a thinner and/or a pulse air, b) a first flushing line starting from the first flushing connection and opening into the first return line downstream of the downstream first return valve, c) a first flushing valve arranged in the first flushing line and controlling an inflow of the thinner and/or the pulse air from the first flushing connection into the first return line.

3. An atomizer according to claim 1, further comprising:

a) at least one controllable hardener valve, which is arranged in the hardener line and controls an inflow of the hardener, and b) at least one controllable master paint valve, which is arranged in the master paint line and controls an inflow of the master paint.

4. An atomizer according to claim 1, further comprising a) a second return connection for returning the master paint, b) a second return line branching off from the master paint line upstream of a master paint valve and opening into the second return connection, c) a controllable third return valve, which is arranged in the second return line and controls a return flow through the second return connection.

5. An atomizer according to claim 1, further comprising a) a second flushing line, which starts from a second flushing connection or from a first flushing connection and opens into the master paint line downstream of a master paint valve, b) a second flushing valve, which is arranged in the second flushing line and controls an inflow of a flushing agent into the master paint line, c) a third flushing line which starts from a third flushing connection or from the first flushing connection or the second flushing connection and opens into the hardener line downstream of a hardener valve, d) a third flushing valve, which is arranged in the third flushing line and controls the inflow of the flushing agent into the hardener line.

6. An atomizer according to claim 1, further comprising:

a) a short-flushing line leading downstream of the main valve to the applicator element and originating from a first flushing connection or from a second flushing connection or from a third flushing connection or from a fourth flushing connection, b) a controllable short-flushing valve, which is arranged in the short-flushing line and controls a flow of a flushing agent through the short-flushing line.

7. An atomizer according to claim 1, further comprising a paint tube containing the mixer and the second return valve.

8. An atomizer according to claim 1, wherein a) the second return valve is designed as a diaphragm needle valve with the following components:

a1) a valve seat, a2) a displaceable valve needle which, depending on its position, opens or blocks the valve seat a3) a valve diaphragm which annularly surrounds the valve needle and serves to drive the valve needle and/or to seal it, b) the valve seat of the second return valve is made of steel, c) the valve needle of the second return valve passes through a sealing disc made of plastic, d) the valve needle of the second return valve is made of titanium, e) the mixer opens on an outlet side into a distributor which passes on the multicomponent paint and is at least partially made of a metal.

9. An atomizer according to claim 1, wherein the at least one main valve includes a valve seat, a displaceable valve needle which, depending on its position, opens or blocks the valve seat, and a valve diaphragm which annularly surrounds the valve needle.

10. An atomizer adapted for applying a multicomponent paint, comprising:

a) at least one master paint connection for supplying a master paint, b) at least one hardener connection for supplying a hardener, c) at least one mixer for mixing the master paint with the hardener to form the multicomponent paint, d) at least one hardener line leading in the atomizer from the hardener connection to the mixer, e) at least one master paint line leading in the atomizer from the master paint connection to the mixer, f) at least one main valve for controlling a delivery of the multicomponent paint, the main valve being arranged downstream of the mixer and controlling a flow of the multicomponent paint to an application element, g) a first return connection for returning the multicomponent paint from the atomizer to a return line, h) a first return line which branches off in the atomizer between the mixer and the main valve and opens into the first return connection, i) a second return connection for returning the master paint, j) a second return line branching off from the master paint line upstream of a master paint valve and opening into the second return connection, and k) a controllable third return valve, which is arranged in the second return line and controls a return flow through the second return connection.

* * * * *